US010082832B1

(12) United States Patent
Wang et al.

(10) Patent No.: US 10,082,832 B1
(45) Date of Patent: Sep. 25, 2018

(54) DISPLAY DEVICE AND ELECTRONIC DEVICE

(71) Applicant: Acer Incorporated, New Taipei (TW)

(72) Inventors: Jian-Siang Wang, New Taipei (TW);
Shun-Bin Chen, New Taipei (TW);
Han-Tsung Shen, New Taipei (TW);
Huei-Ting Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/851,714

(22) Filed: Dec. 21, 2017

(30) Foreign Application Priority Data

Sep. 1, 2017 (TW) .............................. 106129925 A

(51) Int. Cl.
*G06F 1/16* (2006.01)
(52) U.S. Cl.
CPC .......... *G06F 1/1641* (2013.01); *G06F 1/1616* (2013.01); *G06F 1/1681* (2013.01)
(58) Field of Classification Search
CPC .... G06F 1/1624; G06F 1/1647; G06F 1/1649; G06F 1/165
See application file for complete search history.

(56) References Cited

U.S. PATENT DOCUMENTS

| | | | | |
|---|---|---|---|---|
| 5,768,096 A * | 6/1998 | Williams | ............... | G06F 1/1616 361/679.04 |
| 6,151,401 A * | 11/2000 | Annaratone | .......... | G06F 1/1616 361/679.23 |
| 7,138,962 B2 * | 11/2006 | Koenig | ................. | G06F 1/1616 345/1.3 |
| 8,018,715 B2 * | 9/2011 | Chang | ................... | G06F 1/1616 248/917 |
| 8,243,471 B2 * | 8/2012 | Liang | ..................... | G06F 1/1603 361/807 |
| 9,927,839 B2 * | 3/2018 | Kummer | ............... | G06F 1/1641 |

(Continued)

FOREIGN PATENT DOCUMENTS

TW 201301003 1/2013

OTHER PUBLICATIONS

Li Wenen, "Bring you own 3K 4K screen to blame, Razer released a new monster level Project Valerie esports notebook", with English translation thereof, Jan. 6, 2017, Available at: https://bit.ly/2K1fsYC.

*Primary Examiner* — Anthony Q Edwards
(74) *Attorney, Agent, or Firm* — JCIPRNET

(57) ABSTRACT

A display device including a main display and two sub-displays is provided. The main display has main display surface and a first frame area surrounding the main display surface. The two sub-displays are movably connected with the main display, wherein the two sub-displays are arranged side by side on the main display and cover the main display surface and the first frame area. Each of the sub-displays has a sub-display surface and a second frame area surrounding the sub-display surface. One side of each of the sub-display surfaces is exposed from the corresponding second frame area, and the two sides are aligned and attached together. After the two sub-displays are respectively moved relative to the main display along two opposite moving directions so as to separate the two sides from each other, the main display is exposed to the outside. An electronic device is also provided.

16 Claims, 9 Drawing Sheets

(56) References Cited

U.S. PATENT DOCUMENTS

| | | | | |
|---|---|---|---|---|
| 2002/0021258 | A1* | 2/2002 | Koenig | G06F 1/1616 345/1.1 |
| 2003/0095373 | A1* | 5/2003 | Duquette | G06F 1/1607 361/679.04 |
| 2006/0082518 | A1* | 4/2006 | Ram | G06F 1/1601 345/1.1 |
| 2006/0268500 | A1* | 11/2006 | Kuhn | G06F 1/1616 361/679.04 |
| 2007/0247798 | A1* | 10/2007 | Scott, II | G06F 1/1616 361/679.04 |
| 2007/0285343 | A1* | 12/2007 | Han | G06F 1/1616 345/1.3 |
| 2008/0144265 | A1* | 6/2008 | Aoki | G06F 1/1601 361/679.04 |
| 2010/0060587 | A1* | 3/2010 | Freund | G06F 1/1616 345/169 |
| 2011/0216064 | A1* | 9/2011 | Dahl | G06F 1/1616 345/428 |
| 2015/0138703 | A1* | 5/2015 | Gillis | G06F 1/1626 361/679.04 |

* cited by examiner

DISPLAY DEVICE AND ELECTRONIC DEVICE

CROSS-REFERENCE TO RELATED APPLICATION

This application claims the priority benefit of Taiwan application serial no. 106129925, filed on Sep. 1, 2017. The entirety of the above-mentioned patent application is hereby incorporated by reference herein and made a part of this specification.

BACKGROUND

Field of the Invention

The invention relates to a display device and an electronic device. More particularly, the invention relates to a display device and an electronic device capable of expanding a display screen.

Description of Related Art

In order to expand a display screen to obtain a better visual effect, one of currently available methods is to join a plurality of displays into a large-size display device and divide the entire display screen into a plurality of sub display screens according to the number of the displays. Each of the displays shows the corresponding sub display screen, such that the sub display screens are joined into the entire display screen. However, such method costs high and has a disadvantage of having difficulty in accommodation. Moreover, a border between any two adjacent sub-displays causes discontinuity to the entire display screen.

Another currently available method is to accommodate two sub-displays on a back side of the main display (which is a side opposite to a display surface), where orthogonal projections of the two sub-displays overlap with each other on the main display, and a size of any one of the sub-displays is substantially the same as that of the main display, which results in shortcomings, such as a heavy overall weight and a great overall thickness. Moreover, after the two sub-displays are expanded relative to the main display along two opposite directions to and joined into a large-size display device, the border between one of the sub-displays adjacent thereto and the main display still causes discontinuity to the entire display screen.

SUMMARY

The invention provides a display device and an electronic device capable of expanding a display screen and keeping the expanded display screen in continuity.

A display device of the invention includes a main display and two sub-displays. The main display has a main display surface and a first frame area surrounding the main display surface. The two sub-displays are movably connected with the main display. The two sub-displays are arranged side by side on the main display and cover the main display surface and the first frame area. Each of the sub-displays has a sub-display surface and a second frame area surrounding the sub-display surface. A side of each of the sub-display surfaces is exposed from the corresponding second frame area, and the two sides are aligned and attached to each other. After the two sub-displays are respectively moved relative to the main display along two moving directions which are opposite to each other so as to separate the two sides from each other, the main display is exposed to the outside.

An electronic device of the invention includes a body and the aforementioned display device which are pivoted to each other.

Based on the above, the electronic device of the invention is equipped with a display device capable of expanding a display screen. In addition, the display device is equipped with two sub-displays. A side of the sub-display surface of each sub-display is designed in a borderless manner, and the two borderless sides are opposite to each other. Before the two sub-displays are expanded relative to the main display, the two borderless sides are aligned and attached to each other, such that the two sub-display surfaces can be joined into a continuous combined display surface. After the two sub-displays are expanded relative to the main display to expose the main display surface of the main display, the two borderless sides are separated from each other, and each of the sub-display surfaces can be joined with the main display surface with the borderless side, such that the expanded display screen can remain continuous.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
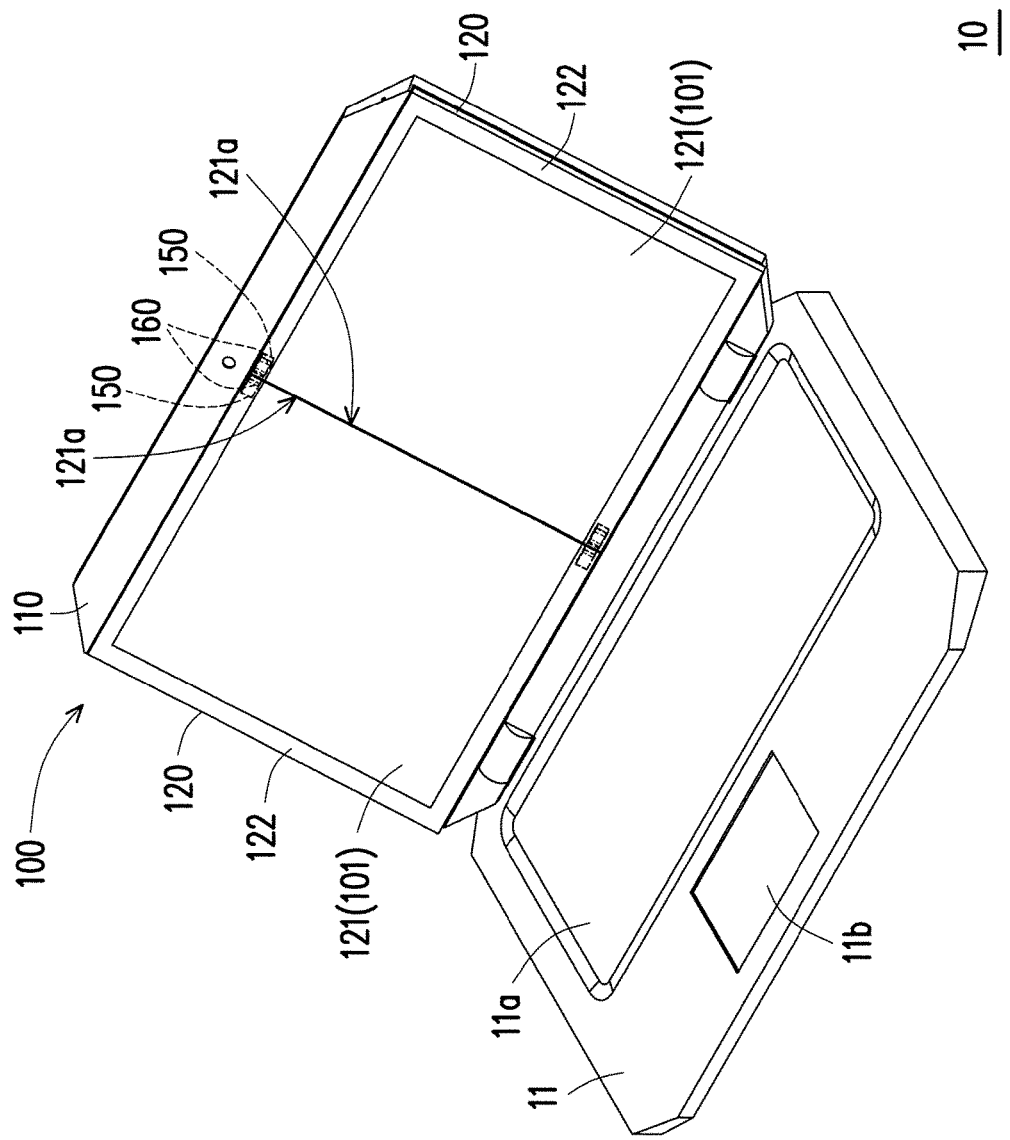
FIG. 1A is a schematic diagram illustrating an electronic device in an initial state according to an embodiment of the invention.
Figure 1B:
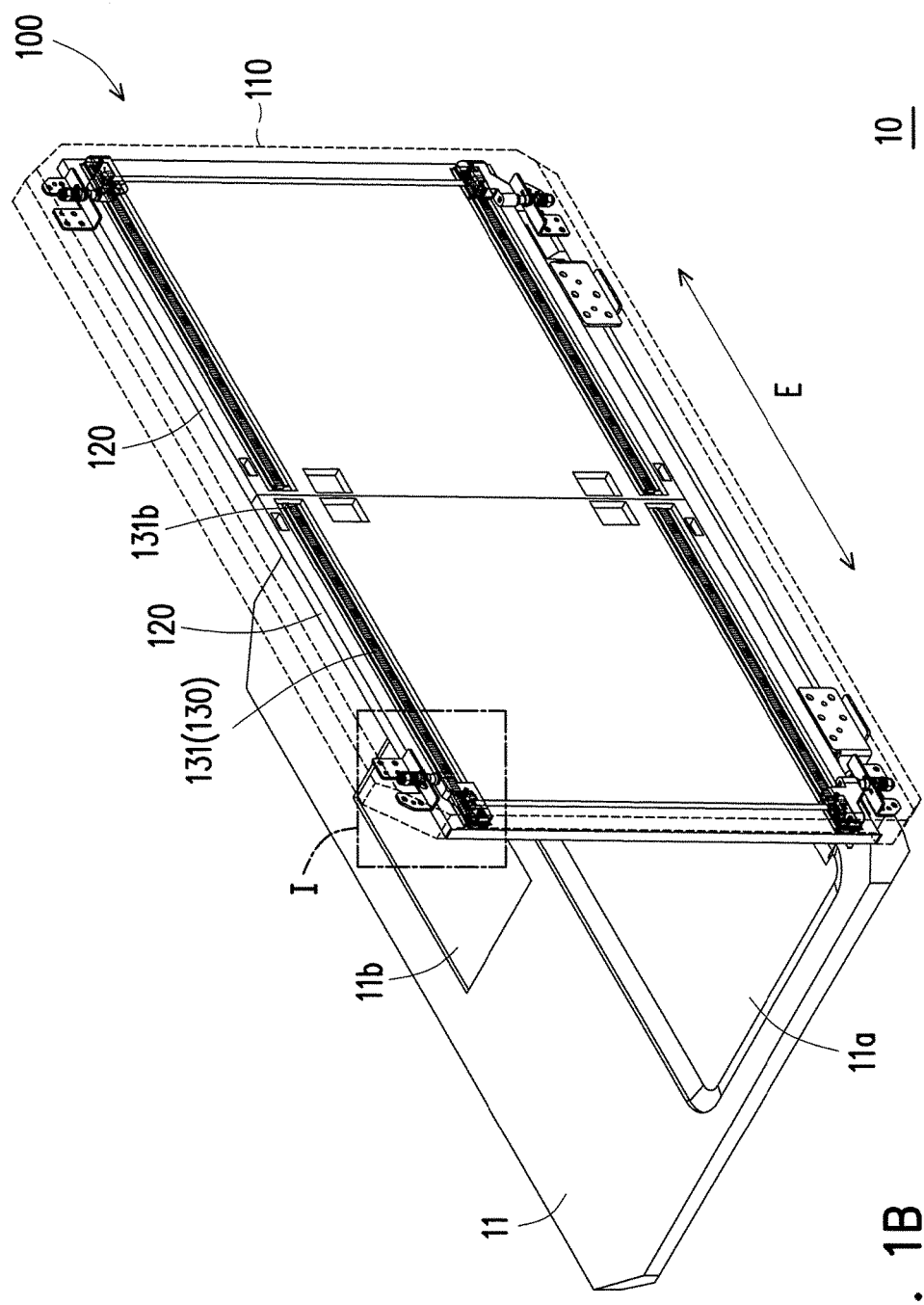
FIG. 1B is a schematic diagram illustrating the electronic device depicted in FIG. 1A in another viewpoint.
Figure 1C:
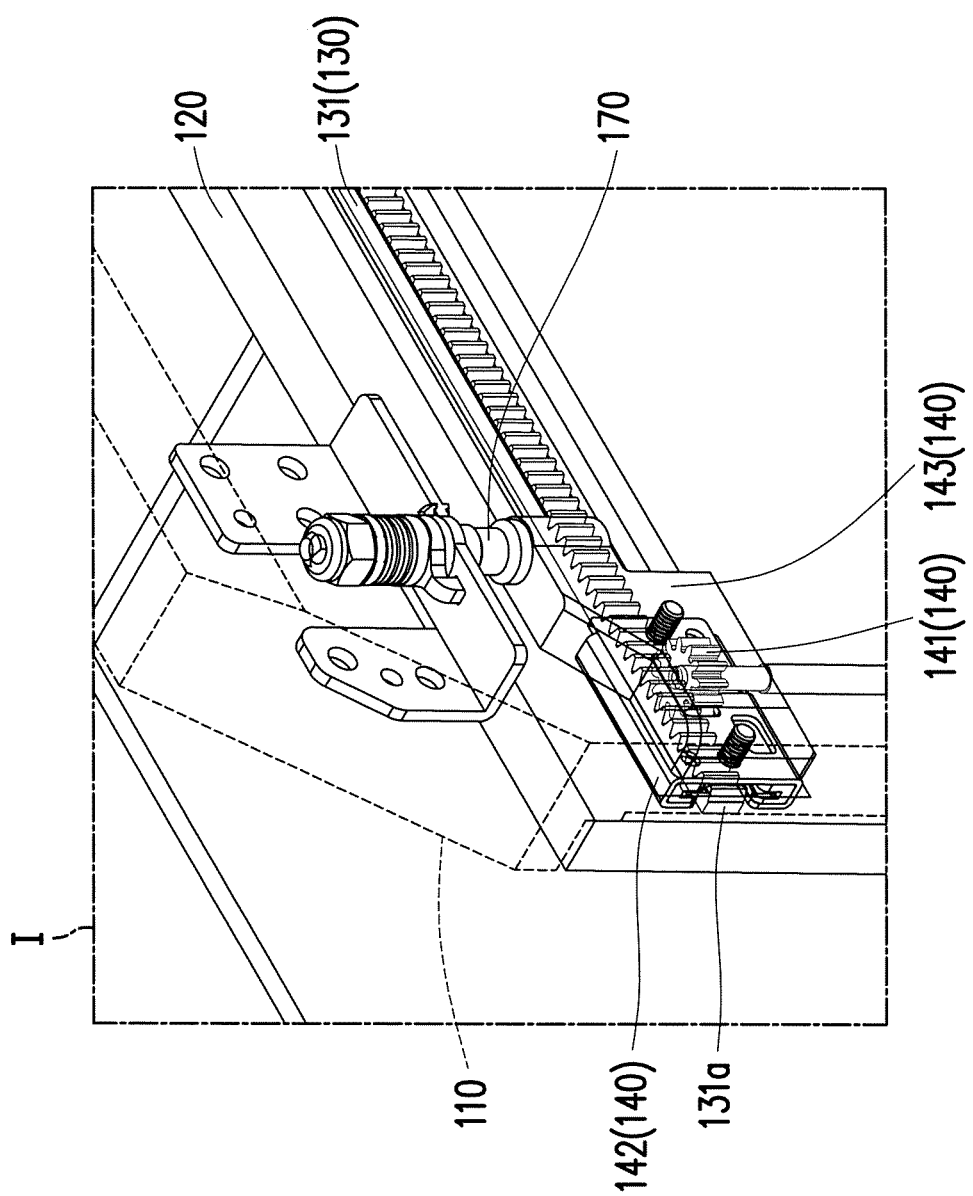
FIG. 1C is a schematic enlarged diagram illustrating an area I in FIG. 1B.

FIG. 1A is a schematic diagram illustrating an electronic device in an initial state according to an embodiment of the invention. FIG. 1B is a schematic diagram illustrating the electronic device depicted in FIG. 1A in another viewpoint. FIG. 1C is a schematic enlarged diagram illustrating an area I in FIG. 1B. For the sake of clear illustration and descriptive convenience, a part of components are illustrated with dashed lines or in a perspective manner in the figures.

Referring to FIG. 1A to FIG. 1C, in the present embodiment, an electronic device 10 may be a notebook computer or a combination of a tablet computer and a docking station. The electronic device 10 includes a body 11 and a display device 100 which are pivoted to each other, and the body 11 may be equipped with a keyboard assembly 11a and a touch pad 11b.

The display device 100 includes a main display 110 and two sub-displays 120. In an initial state, the two sub-displays 120 are arranged side by side on the main display 110, and orthogonal projections of the two sub-displays 120 do not overlap with each other on the main display 110, which contributes to reducing an overall thickness of the display device 100. Likewise, it also contributes to reducing an overall thickness of the electronic device 10 when the display device 100 covers the body 11, so as to meet a design trend of miniaturization. On the other hand, a size of each of the two sub-displays 120 is approximately ½ of a size of the main display 110, which contributes to reducing an overall weight. Furthermore, the main display 110 has a main display surface 111 (with reference to FIG. 2A or FIG. 3A) and a first frame area 112 (with reference to FIG. 2A or FIG. 3A) surrounding the main display surface 111. In the initial state, both the main display surface 111 (with reference to FIG. 2A or FIG. 3A) and the first frame area 112 (with reference to FIG. 2A or FIG. 3A) are covered by the two sub-displays 120 which are close to each other. Namely, in the initial state, a user is unable to see the main display surface 111 (with reference to FIG. 2A or FIG. 3A) and the first frame area 112 (with reference to FIG. 2A or FIG. 3A), but able to see a combined display surface 101 formed by joining the two sub-displays 120. The combined display surface 101 may keep continuous without any border crossing therethrough, and a size of the combined display surface 101 is substantially equal to a size of the main display surface 111 (with reference to FIG. 2A or FIG. 3A).

The two sub-displays 120 are movably connected with the main display 110. The two sub-displays 120 are arranged side by side on the main display 110. Each of the sub-displays 120 has a sub-display surface 121 and a second frame area 122 surrounding the sub-display surface 121, and the combined display surface 101 is formed by joining the two sub-display surfaces 121. In the present embodiment, a side 121a of each sub-display surface 121 is exposed from the corresponding second frame area 122. Namely, a side of the sub-display surface 121 of each of the sub-displays 120 is designed in a borderless manner, the two borderless sides 121a are opposite to each other, and each of the second frame areas 122 surrounds the other three sides of the corresponding sub-display surface 121. The two sides 121a are aligned and attached to each other, and thus, the two sub-display surfaces 121 may be joined together to form the continuous combined display surface 101.

Continuously referring to FIG. 1A to FIG. 1C, the display device 100 further includes two first guide members 130 and two second guide members 140. Each first guide member 130 and each second guide member 140 are arranged in groups, and the first guide member 130 and the second guide member 140 of each group are configured to couple the corresponding sub-display 120 to the main display 110, thereby achieving relative motion between the corresponding sub-display 120 and the main display 110. Taking a coupling manner between one of the sub-displays 120 and the main display 110 for example, the first guide members 130 may be racks 131 which disposed symmetrically on an upper side and a lower side of the sub-display 120, and disposed on a side of the sub-display 120 with back facing the sub-display surface 121. On the other hand, the second guide members 140 may be disposed corresponding to the racks 131, and disposed symmetrically on an upper side and a lower side of the main display 110. The second guide members 140 include gears 141 configured to couple to the racks 131, and the gears 141 are disposed on lateral sides of the first frame area 112 (with reference to FIG. 2A or FIG. 3A). Each rack 131 has a first end portion 131a and a second end portion 131b opposite to the first end portion 131a, and when the two sides 121a are aligned and attached to each other, each gear 141 is coupled to the first end portion 131a of the corresponding rack 131.

An extension direction E of each of the racks 131 of the sub-displays 120 is parallel to each other and employed to determine moving directions D1 and D2 along which the two sub-displays 120 move relative to the main display 110. Thus, the moving directions D1 and D2 are respectively parallel to the extension direction E. In this case, the moving directions D1 and D2 respectively refer to directions along which the two sub-displays 120 move relative to the main display 110 and separated therefrom. By contrast, the two sub-displays 120 may respectively move relative to the main display 110 along directions opposite to the moving directions D1 and D2, so as to return to the initial state.

Figure 2A:
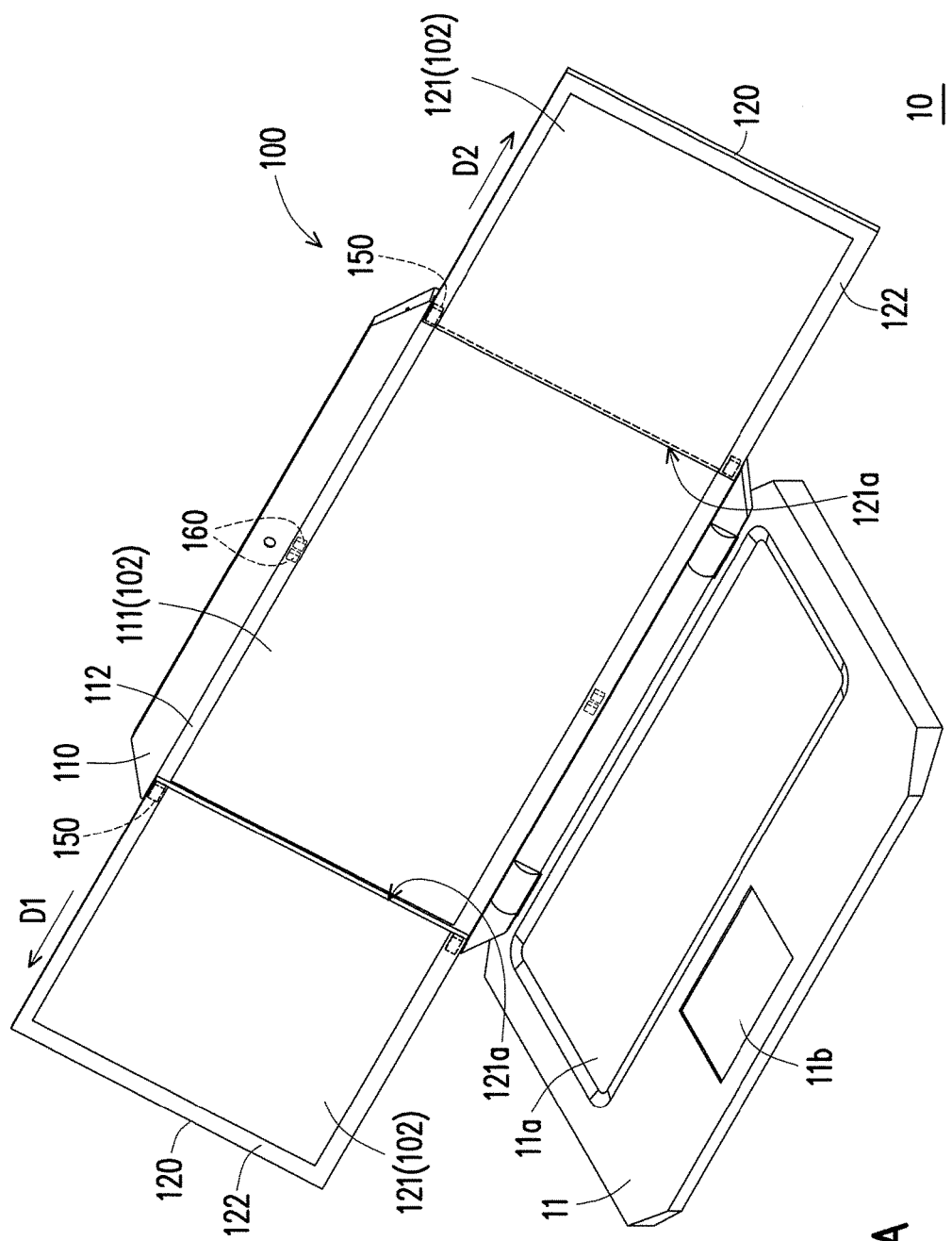
FIG. 2A is a schematic diagram illustrating the electronic device in a first expanded state according to an embodiment of the invention.
Figure 2B:
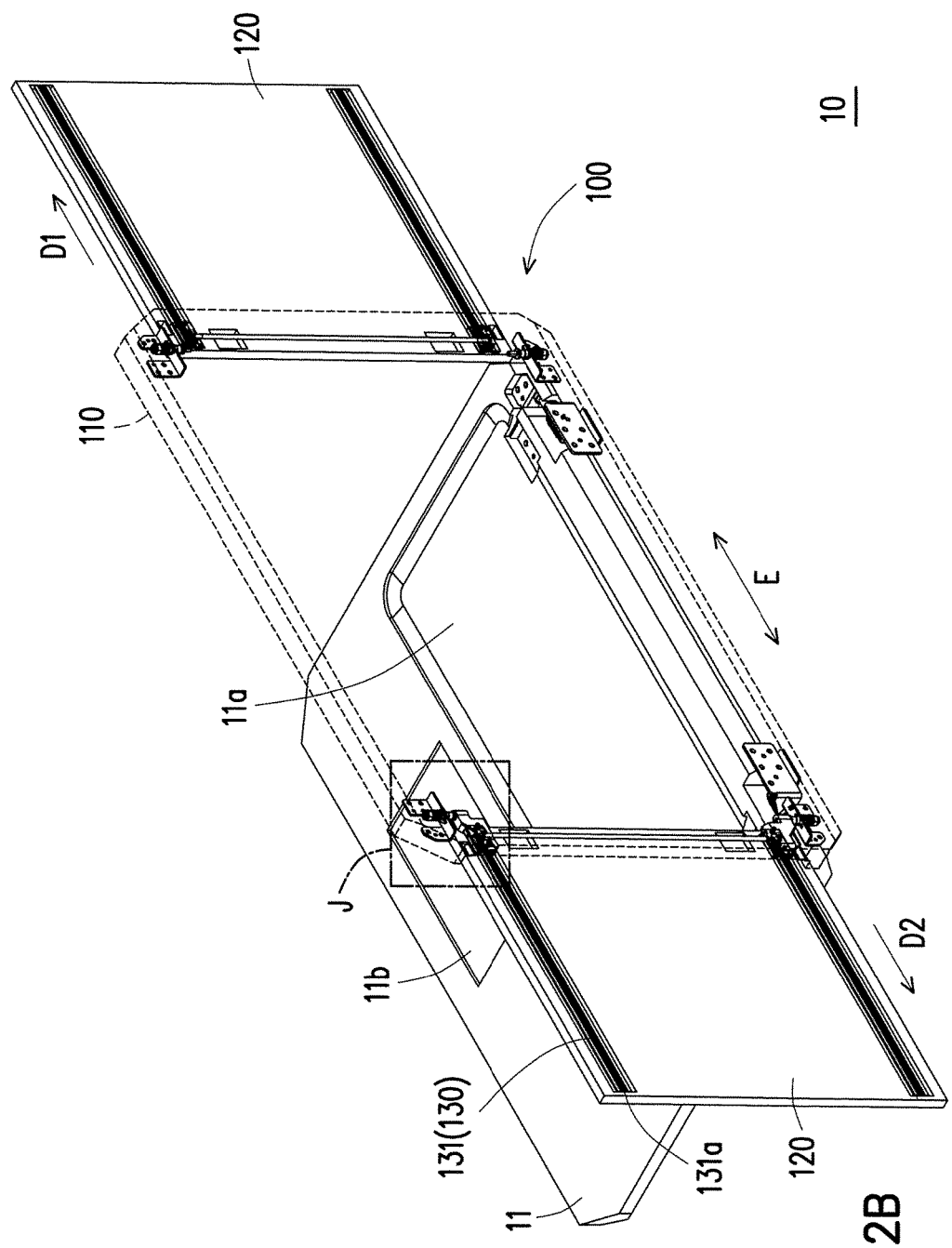
FIG. 2B is a schematic diagram illustrating the electronic device depicted in FIG. 2A in another viewpoint.
Figure 2C:
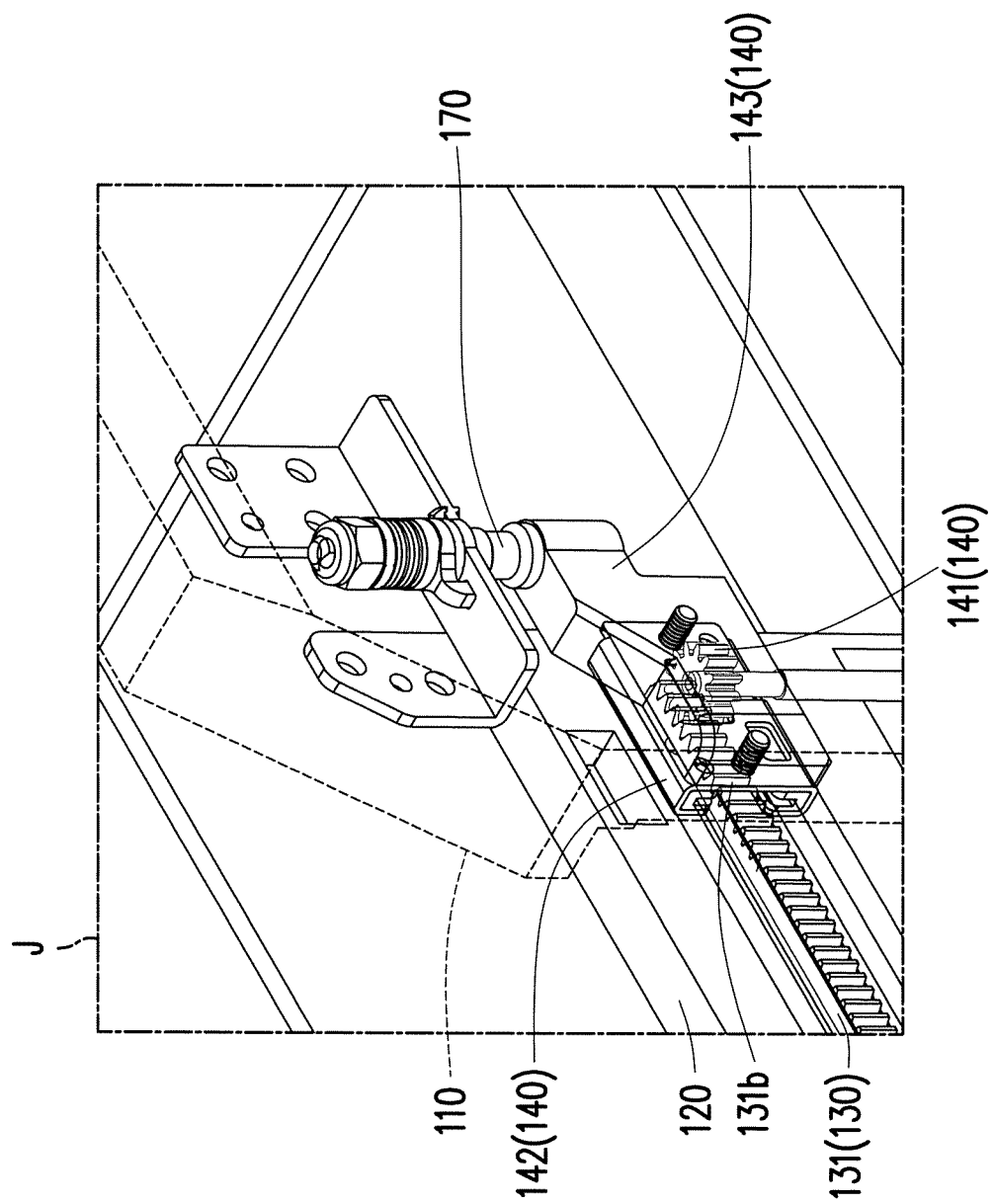
FIG. 2C is a schematic enlarged diagram illustrating an area J in FIG. 2B.

FIG. 2A is a schematic diagram illustrating the electronic device in a first expanded state according to an embodiment of the invention. FIG. 2B is a schematic diagram illustrating the electronic device depicted in FIG. 2A in another viewpoint. FIG. 2C is a schematic enlarged diagram illustrating an area J in FIG. 2B. For the sake of clear illustration and descriptive convenience, a part of components are illustrated with dashed lines or in a perspective manner in the figures. Referring to FIG. 2A to FIG. 2C, when the two sub-displays 120 respectively move relative to the main display 110 along the moving directions D1 and D2 so as to separate the two sides 121a from each other, each rack 131 moves relative to the corresponding gear 141 (the gear 141 in this case is driven by the corresponding rack 131 to rotate), until each gear 141 moves from the first end portion 131a to the second end portion 131b of the corresponding rack 131 to couple to the second end portion 131b of the corresponding rack 131. In this way, the main display surface 111 is completely exposed to the outside, and two opposite sides of the first frame area 112 are respectively covered by the two sides 121a. Thus, in the first expanded state, each sub-display surface 121 may be connected with the main display surface 111 with the borderless side 121a, so as to be joined together into a continuous combined display surface 102. Namely, junctions between the two sub-display surfaces 121 and the main display surface 111 are not crossed through by the two opposite sides of the first frame area 112. For example, a size of the combined display surface 102 may be the size of the main display surface 111 or twice the size of the combined display surface 101, so as to achieve an effect of an expanded display screen.

In the present embodiment, the display device 100 further includes two positioning members 150, each of the positioning members 150 may include a magnet, and the positioning members 150 may be symmetrically disposed at the upper side and the lower side of the corresponding sub-displays 120. In addition, each of the positioning members 150 is disposed at one side of the corresponding second frame area 122 which is close to the side 121a. The positioning members 150 respectively disposed on the two sub-displays 120 have different magnetic polarities, such that the two sub-displays 120 may be maintained in the initial state as illustrated in FIG. 1A by a magnetic attraction force between the two positioning members 150 when the two sides 121*a* are aligned and attached to each other, so as to prevent the two sub-displays 120 from arbitrarily moving relative to the main display 110. On the other hand, the display device 100 further includes two sensors 160, and each of the sensors 160 includes a Hall sensor and is disposed corresponding to each of the positioning members 150 on the first frame area 112. When the two sides 121*a* are aligned and attached to each other, each of the sensors 160 is aligned to the corresponding positioning member 150 and employed to sense a magnetic field of the positioning member 150.

In addition, in the initial state as illustrated in FIG. 1A, a magnetic flux measured by each of the sensors 160 is not changed, the display screen is divided into two sub display screens which are respectively displayed on the sub-display surface 121 and are joined into a full display screen. When the two sub-displays 120 respectively move relative to the main display 110 along the moving directions D1 and D2 so as to separate the two sides 121*a* from each other, each of the positioning members 150 moves away from the corresponding sensor 160, such that the magnetic flux measured by each of the sensors 160 is reduced, and an output voltage signal of each of the sensors 160 is changed as well. As illustrated in FIG. 2A, after the two sub-displays 120 are expanded relative to the main display 110 to completely expose the main display surface 111, in response to the changes of the output voltage signals of the sensors 160, the processor and the controller further divides the display screen into three sub display screens, where one of the sub display screens is displayed on the main display surface 111, the other two sub display screens are respectively displayed on the two sub-display surface s121, and the three sub display screens are joined into the full display screen.

After the two sub-displays 120 respectively move relative to the main display 110 along the moving directions D1 and D2 so as to separate the two sides 121*a* from each other and couple each gear 141 to the second end portion 131*b* of the corresponding rack 131, each of the sub-displays 120 may rotate relative to the main display 110 through the corresponding first guide member 130 and second guide member 140, which will be further described below.

Figure 3A:
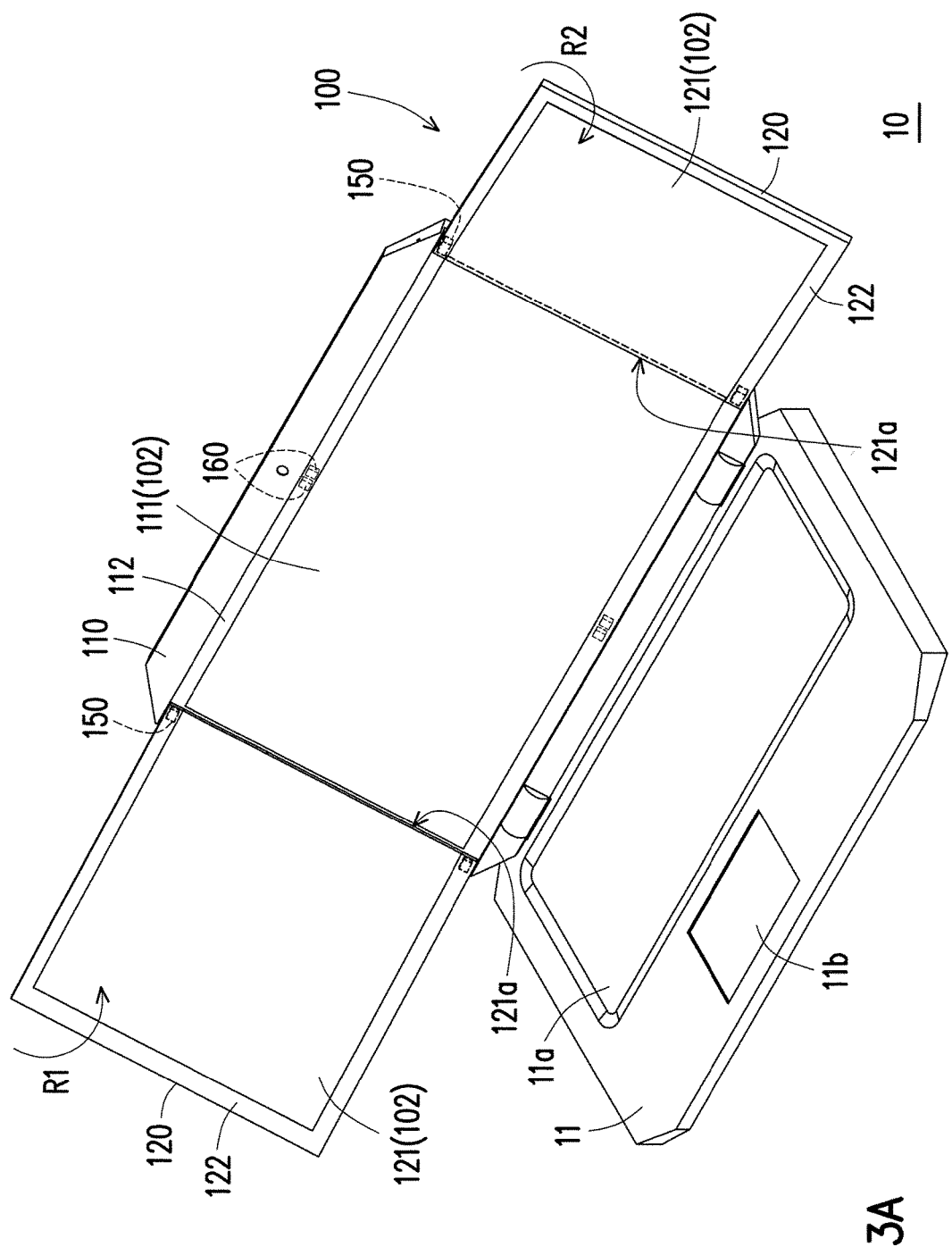
FIG. 3A is a schematic diagram illustrating the electronic device in a second expanded state according to an embodiment of the invention.
Figure 3B:
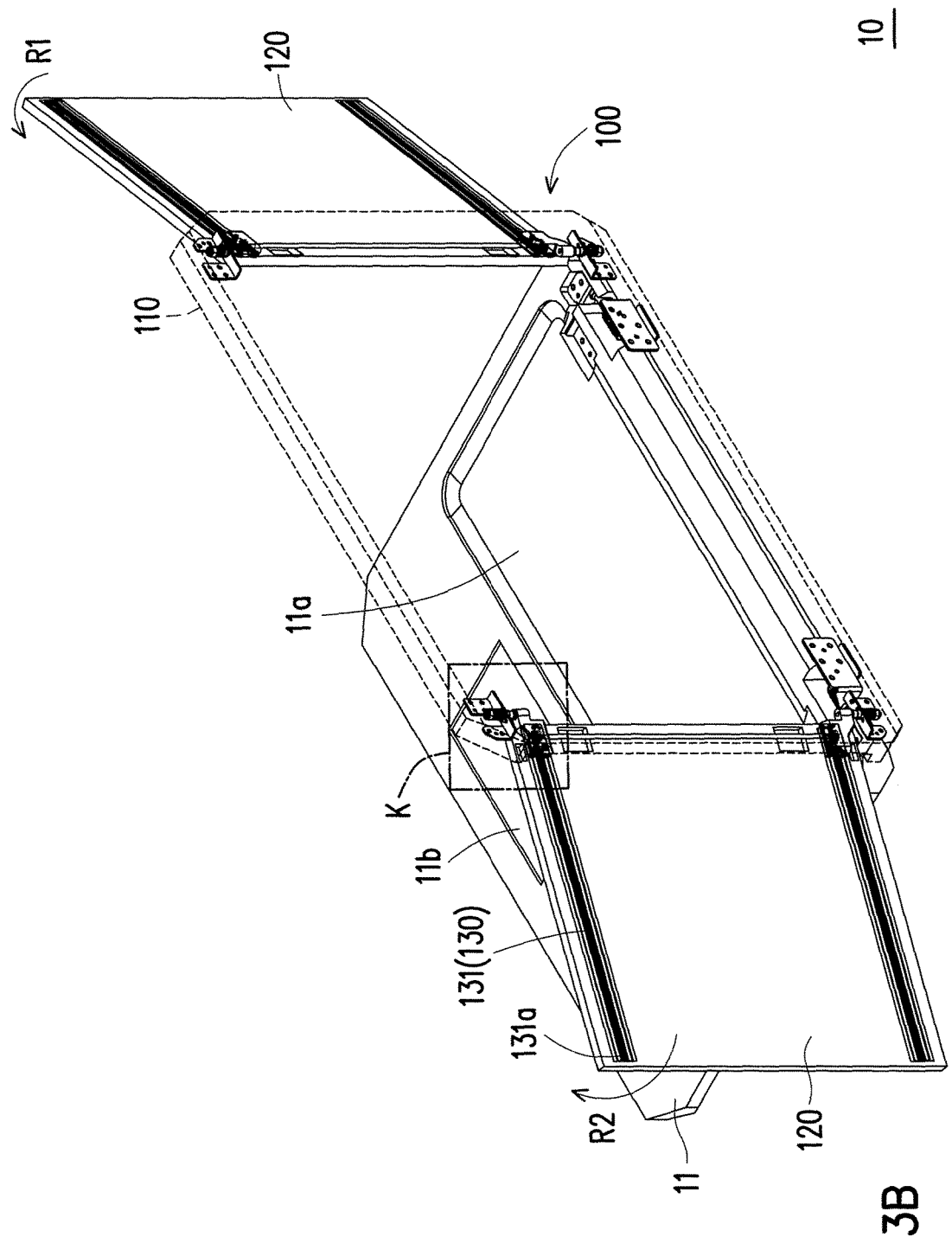
FIG. 3B is a schematic diagram illustrating the electronic device depicted in FIG. 3A in another viewpoint.
Figure 3C:
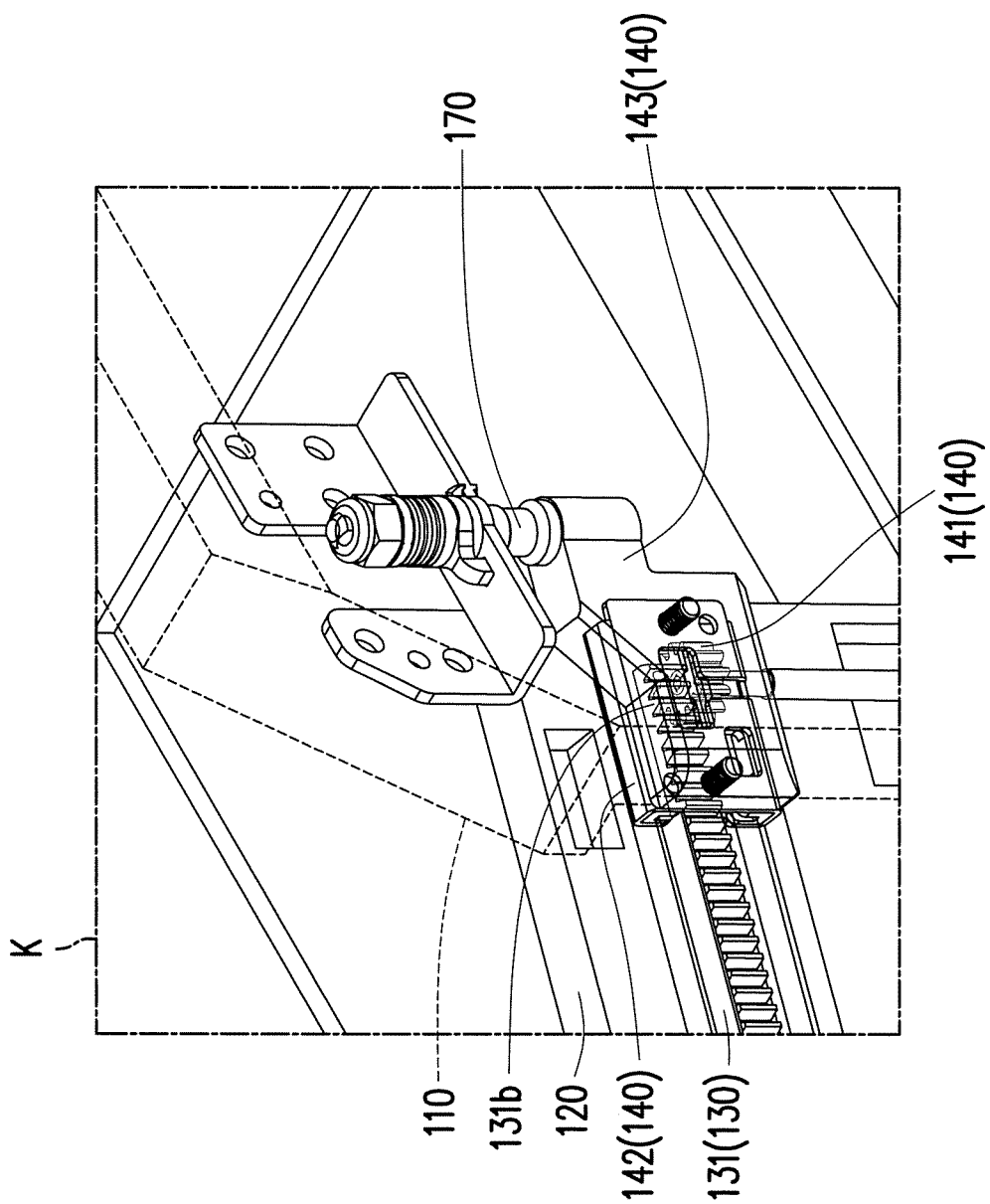
FIG. 3C is a schematic enlarged diagram illustrating an area K in FIG. 3B.

FIG. 3A is a schematic diagram illustrating the electronic device in a second expanded state according to an embodiment of the invention. FIG. 3B is a schematic diagram illustrating the electronic device depicted in FIG. 3A in another viewpoint. FIG. 3C is a schematic enlarged diagram illustrating an area K in FIG. 3B. For the sake of clear illustration and descriptive convenience, a part of components are illustrated with dashed lines or in a perspective manner in the figures. Referring to FIG. 3A to FIG. 3C, in the present embodiment, the two sub-displays 120 originally illustrated in FIG. 2A are respectively parallel to the main display 110, the two sub-displays 120 may respectively rotate relative to the main display 110 about rotation directions R1 and R2 which are opposite to each other, such that the two sub-displays 120 approach to the main display surface 111 and is inclined to the main display 110. In this circumstance, the combined display surface 102 is transferred from a plane-like display state as illustrated in FIG. 2A to a surrounding display state as illustrated in FIG. 3A, which allows the user to obtain a preferable view angle range and visual effect.

In the present embodiment, the display device 100 further includes two shafts 170, where the shafts 170 are symmetrically disposed at the upper side and the lower side of the main display 110 and respectively pivoted to the two opposite sides of the first frame area 112. On the other hand, each second guide member 140 is connected with the main display 110 through the corresponding shaft 170. When each second guide member 140 rotates relative to the main display 110 through the corresponding shaft 170, each first guide member 130 and its corresponding sub-display 120 also rotate relative to the main display 110 along with the corresponding second guide member 140 in the presence of the coupling relationship between each first guide member 130 and the corresponding second guide member 140.

Each second guide member 140 further includes guide portions 142 and connection portions 143, and each connection portion 143 is connected with the corresponding guide portion 142 and the corresponding shaft 170. Each rack 131 is slidably disposed at the corresponding guide portion 142, and each gear 141 is rotatably disposed at the corresponding guide portions 142 so as to couple to the corresponding rack 131. When each rack 131 moves relative to the corresponding guide portions 142, each gear 141 is driven by the corresponding rack 131 to rotate. In addition, each sub-display 120 may rotate relative to the main display 110 by means of the connection relationship between the corresponding rack 131 and guide portion 142 and between the corresponding rack 131 and gear 141, the connection relationship between the corresponding guide portion 142 and connection portion 143 and the connection relationship between the corresponding connection portion 143 and shaft 170.

In light of the foregoing, the electronic device of the invention is equipped with a display device capable of expanding a display screen. In addition, the display device is equipped with two sub-displays. A side of the sub-display surface of each sub-display is designed in a borderless manner, and the two borderless sides are opposite to each other. Before the two sub-displays are expanded relative to the main display, the main display surface of the main display is covered by the two sub-displays, and the two borderless sides are aligned and attached to each other, such that the two sub-display surfaces can be joined into the continuous combined display surface. After the two sub-displays are expanded relative to the main display to expose the main display surface of the main display, the two borderless sides are separated from each other, and each of the sub-display surfaces can be joined with the main display surface with the borderless side, such that the expanded display screen can remain continuous. As the size of each of the two sub-displays is approximately ½ of that of the main display, it can contribute to reducing the overall weight. Meanwhile, before the two sub-displays are expanded relative to the main display, the orthogonal projections of the two sub-displays do not overlap with each other on the main display, which can contribute to reducing the overall thickness and meet the design trend of miniaturization.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A display device, comprising:
 a main display, having a main display surface and a first frame area surrounding the main display surface; and
 two sub-displays, movably connected with the main display, wherein the two sub-displays are arranged side by side on the main display and cover the main display surface and the first frame area, each of the sub-displays has a sub-display surface and a second frame area surrounding the sub-display surface, a side of each of the sub-display surfaces is exposed from the corresponding second frame area, the two sides are aligned and attached to each other, and after the two sub-displays are respectively moved relative to the main display along two moving directions which are opposite to each other so as to separate the two sides from each other, the main display is exposed to the outside.

2. The display device according to claim 1, further comprising:
two first guide members, each of the first guide members being disposed on a side of the corresponding sub-display with back facing the sub-display surface; and
two second guide members, respectively disposed on two opposite sides of the first frame area and respectively coupled to the two first guide members.

3. The display device according to claim 2, wherein each of the first guide members comprises a rack, an extension direction of each of the racks is parallel to the two moving directions, and each of the second guide members comprises a gear coupled to the corresponding rack.

4. The display device according to claim 3, further comprising:
two shafts, respectively pivoted to two opposite sides of the first frame area, and each of the second guide members being connected with the main display through the corresponding shaft.

5. The display device according to claim 4, wherein each of the second guide members further comprises a guide portion and a connection portion, each of the connection portions is connected with the corresponding guide portion and the corresponding shaft, each of the racks is slidably disposed in the corresponding guide portions, and each of the gears is rotatably disposed at the corresponding guide portion.

6. The display device according to claim 3, wherein each of the racks has a first end portion and a second end portion opposite to the first end portion, when the two sides are aligned and attached to each other, each of the gears is coupled to the first end portion of the corresponding rack, when the two sub-displays respectively move relative to the main display along the two moving directions to separate the two sides from each other, each of the racks moves relative to the corresponding gear until each of the gears is coupled to the second end portion of the corresponding rack to completely expose the main display surface to the outside, and the two opposite sides of the first frame area are respectively covered by the two sides.

7. The display device according to claim 1, further comprising:
two positioning members, respectively disposed at one side of the two second frame areas which is close to the two sides and configured to fix the two sub-displays when the two sides are aligned and attached to each other.

8. The display device according to claim 7, further comprising:
two sensors, disposed on the first frame area, wherein the two positioning members are respectively magnetic elements, and the two sensors are respectively aligned to the two positioning members when the two sides are aligned and attached to each other.

9. An electronic device, comprising:
a body; and
a display device, pivoted to the body and comprising:
a main display, having a main display surface and a first frame area surrounding the main display surface; and
two sub-displays, movably connected with the main display, wherein the two sub-displays are arranged side by side on the main display and cover the main display surface and the first frame area, each of the sub-displays has a sub-display surface and a second frame area surrounding the sub-display surface, a side of each of the sub-display surfaces is exposed from the corresponding second frame area, the two sides are aligned and attached to each other, and after the two sub-displays are respectively moved relative to the main display along two moving directions which are opposite to each other so as to separate the two sides from each other, the main display is exposed to the outside.

10. The electronic device according to claim 9, wherein the display device further comprises:
two first guide members, each of the first guide members being disposed on a side of the corresponding sub-display with back facing the sub-display surface; and
two second guide members, respectively disposed on two opposite sides of the first frame area and respectively coupled to the two first guide members.

11. The electronic device according to claim 10, wherein each of the first guide members comprises a rack, an extension direction of each of the racks is parallel to the two moving directions, and each of the second guide members comprises a gear coupled to the corresponding rack.

12. The electronic device according to claim 11, wherein the display device further comprises:
two shafts, respectively pivoted to two opposite sides of the first frame area, and each of the second guide members being connected with the main display through the corresponding shaft.

13. The electronic device according to claim 12, wherein each of the second guide members further comprises a guide portion and a connection portion, each of the connection portions is connected with the corresponding guide portion and the corresponding shaft, each of the racks is slidably disposed in the corresponding guide portions, and each of the gears is rotatably disposed at the corresponding guide portion.

14. The electronic device according to claim 11, wherein each of the racks has a first end portion and a second end portion opposite to the first end portion, when the two sides are aligned and attached to each other, each of the gears is coupled to the first end portion of the corresponding rack, when the two sub-displays respectively move relative to the main display along the two moving directions to separate the two sides from each other, each of the racks moves relative to the corresponding gear until each of the gears is coupled to the second end portion of the corresponding rack to completely expose the main display surface to the outside, and the two opposite sides of the first frame area are respectively covered by the two sides.

15. The electronic device according to claim 9, wherein the display device further comprises:
two positioning members, respectively disposed at one side of the two second frame areas which is close to the two sides and configured to fix the two sub-displays when the two sides are aligned and attached to each other.

16. The electronic device according to claim 15, wherein the display device further comprises:
two sensors, disposed on the first frame area, wherein the two positioning members are respectively magnetic elements, and the two sensors are respectively aligned to the two positioning members when the two sides are aligned and attached to each other.

* * * * *